United States Patent [19]

Wagner

[11] 4,216,401
[45] Aug. 5, 1980

[54] SURFACE ACOUSTIC WAVE (SAW) PRESSURE SENSOR STRUCTURE

[75] Inventor: Robert A. Wagner, Manchester, Conn.

[73] Assignee: United Technologies Corporation, Hartford, Conn.

[21] Appl. No.: 972,541

[22] Filed: Dec. 22, 1978

[51] Int. Cl.² .............................................. H01L 41/10
[52] U.S. Cl. ................................ 310/313 R; 333/152; 310/338; 73/754
[58] Field of Search ................. 310/313, 338; 333/152, 333/155; 73/654, 774, 777, 778, 820, 825, 849, 855, 702, 715, 720, 721, 723, 729, 753, 754, 765, 766, 782

[56] References Cited
U.S. PATENT DOCUMENTS

| 3,739,315 | 6/1973 | Kurtz et al. | 73/766 X |
| 3,753,196 | 8/1973 | Kurtz et al. | 73/754 X |
| 3,764,950 | 10/1973 | Wallia | 73/754 X |
| 3,878,477 | 4/1975 | Dias et al. | 310/313 X |
| 3,978,731 | 9/1976 | Reeder et al. | 73/723 X |

Primary Examiner—Mark O. Budd
Attorney, Agent, or Firm—Dominic J. Chiantera

[57] ABSTRACT

An improved SAW pressure sensor structure includes a dual substrate sensor having a SAW substrate with a SAW delay line disposed in an active signal region on a first one of two parallel major surfaces thereof, and having a centrally apertured base substrate of the same material bonded at a mating surface thereof to the second one of the SAW substrate major surfaces with a glass seal, the dual substrates being bonded in crystallographic orientation, the central aperture having segmented portions to provide a major diameter opening at the mating surface coextensive with the active signal region to form a diaphragm and having a minor diameter opening at a second surface of the base substrate at a value less than one half that of the major diameter, the base substrate further including an O-ring groove adapted to receive one end of a cylindrical metal sleeve in a vacuum sealing relationship, the metal sleeve having a diameter equal to one half that of the aperture major diameter, the sleeve being bonded at another end to an orifice formed in one wall of a vacuum sealing enclosure adapted to receive the SAW sensor to provide a fluid conduit for external pressure signals between the orifice and the diaphragm formed in the SAW sensor.

1 Claim, 4 Drawing Figures

SURFACE ACOUSTIC WAVE (SAW) PRESSURE SENSOR STRUCTURE

CROSS REFERENCE TO RELATED APPLICATIONS

Some of the subject matter disclosed herein is similarly disclosed and some of it is claimed in one or more of the following commonly owned, copending applications of the same assignee, entitled: SURFACE ACOUSTIC WAVE (SAW) TRANSDUCER STRUCTURE, U.S. Ser. No. 972,542 filed on Dec. 22, 1978 by D. E. Cullen, and VACUUM ENCAPSULATION FOR SURFACE ACOUSTIC WAVE (SAW) DEVICES, U.S. Ser. No. 945,359, filed on Sept. 25, 1978 by D. E. Cullen and R. A. Wagner.

BACKGROUND OF THE INVENTION

1. Field of Invention

This invention relates to surface acoustic wave (SAW) sensors, such as pressure sensors, and more particularly to an improved SAW pressure sensor structure.

2. Description of the Prior Art

SAW pressure sensors are known in the art, as reported in U.S. Pat. Nos. 3,978,731 and 4,100,811. The SAW pressure sensors are provided by drilling into one surface of a SAW delay line substrate to form an interior, cylindrical cavity in the substrate, such that a deformable diaphragm is formed between a first surface of the SAW delay line and the interior surface formed in the end wall of the cavity. When stress is applied to the diaphragm, such as by an applied fluid pressure, the diaphragm deforms causing a change in the acoustic wave propagation characteristics in that portion of the SAW delay line forming the diaphragm. The change in acoustic wave propagation velocity is measured as a change in the frequency of oscillation of external oscillator circuitry connected in series with the SAW delay line regenerative feedback loop. The operating frequency changes as a result of changes in the propagation velocity, all of which is described in detail in the hereinbefore referenced U.S. patents.

The process of forming the diaphragm in the SAW substrate by boring or drilling a central cavity is subject to a number of limitations. The sensitivity of the pressure sensor is determined in part by the thickness of the deformable diaphragm and it is desirable to accurately control the diaphragm thickness. The depth of the cavity is difficult to control during the drilling process, such that the diaphragm membrane may not always be provided at the optimum thickness. Attempts at providing thin diaphragms often lead to a breakout into the first surface of the substrate. In addition, it is also essential in sensitive devices to maintain parallelism of the diaphragm membrane which is difficult in the drilling process. The drilling itself many times results in microcracks in the interior cavity walls around the periphery of the diaphragm, which in many instances have resulted in device failure due to a ruptured diaphragm at higher operating pressures. Also the diaphragm formed by the cavity has one polished surface (that of the SAW substrate surface containing the delay line) and one unpolished, quasi-lapped surface provided by the ultrasonic boring, creating the possibility of a loss of sensitivity across the diaphragm by allowing the creation of possibly different strains on either surface of the diaphragm.

All of these difficulties in fabrication of the diaphragm may be overcome by building a SAW sensor in two pieces, i.e. two substrates, as suggested in the aforementioned U.S. Pat. No. 3,978,731. There it is disclosed that a separate diaphragm which is either a metal, a dielectric, or a semiconductor material, is bonded to a substrate through ". . . the use of glue, solder, weld, thermo-compression or other joining techniques, . . .". Although there is a lack of disclosure as to the bonding process it may be assumed that the bonds recited may be provided through techniques known in the art. Each of the bonds recited, however, result in limited operating sensor characteristics for any dual substrate sensor formed thereby. The use of a glue presents an obvious limitation on operating temperature. Temperatures which do not exceed, but are close to, the melting temperature result in mobility between the diaphragm and the substrate. In addition the glue is organic and presents a dirty element in any vacuum environment in which the SAW sensor is enclosed, due to the inherent outgassing characteristic of the glue. From either a temperature operating standpoint, or from the standpoint of providing a good vacuum environment for the SAW sensor, the use of a glue bond is unsatisfactory. The other recited bonds, i.e. solder, weld or thermo-compression, all involve the use of metallization between the diaphragm and substrate. Although this may not present a problem where, as recited in the patent, the diaphragm itself is metal, it prevents a severe problem of induced strain into a piezoelectric diaphragm and substrate. The metal seal being adjacent to the diaphragm, any temperature cycling of the SAW sensor provides induced strain into the diaphragm causing severe degradation in the sensitivity of the SAW device. Therefore, all of the recited bonds, both glue and metal, are unsatisfactory for providing a SAW sensor having piezoelectric diaphragm, although any or all of the bonds may have application with either metal diaphragm devices or with low operating temperature devices.

SUMMARY OF THE INVENTION

One object of the present invention is to provide an improved SAW pressure sensor which eliminates the limitations and difficulties attendant with the prior art sensors. Another object of the present invention is to provide an improved SAW pressure sensor structure.

According to the present invention, an improved SAW pressure sensor comprises a dual substrate including a SAW substrate and a base substrate, the SAW substrate having parallel major surfaces spaced relative to each other at a first dimension equal to a desired diaphragm thickness, a first major surface including electro-acoustic transducers disposed in an acitve signal region thereon to provide one or more SAW delay lines, the base substrate having an aperture extending therethrough from a mating surface to a base surface thereon, the substrates being bonded together in crystallographic orientation with a glass seal formed between a second major surface of the SAW substrate and the mating surface of the base substrate, the aperture being segmented to provide a major diameter aperture opening at the mating surface which is coextensive with the active signal region of the SAW substrate and a minor diameter aperture opening at the base surface, the minor diameter opening being less than half the value of the major diameter and being adapted for receiving in a vacuum-sealing relationship a cylindrical metal sleeve, the metal sleeve providing support of the dual substrate within a vacuum encapsulating structure and also providing fluid communication between the aperture and an orifice in the vacuum enclosure, which is responsive to external pressure signals to the sensor diaphragm.

In still further accord with the present invention, the second surface of the base substrate includes an O-ring groove formed in the surface circumferentially about the minimum diameter opening of the aperature, the O-ring having a diameter on the order of one half that of the diaphragm, the metal sleeve having a mating surface which is bonded in the O-ring with a glass seal.

The dual substrate of the improved SAW pressure sensor permits the fabrication of thin-film diaphragms to an exact accuracy. The SAW substrate and the base substrate are processed individually. The SAW substrate is thinned and polished through known techniques to provide any selected diaphragm thickness, the resulting diaphragm having each side polished and having a uniform thickness or parallelism between the two surfaces. The base substrate is formed of the same material, or of material having the same temperature characteristics, as that of the SAW substrate. The central aperture provided through boring methods known in the art permit the formation of an aperture which is substantially free of microcracks along the interior periphery. The two substrates are bonded in crystallographic orientation to provide equal temperature expansion in each of the two axes thereby eliminating any induced strain in the diaphragm from the substrate. The use of a vitreous glass seal as the bond provides for a seal having similar temperature coefficient characteristics to that of the substrate material and, therefore, provides for a minimum of induced thermal strain, any net strain induced by the glass seal producing far less performance degradation of the sensor than that resulting from the cummulative limitations of the prior art sensors.

These and other objects, features and advantages of the present invention will become more apparent in the light of the following detailed description of preferred embodiments thereof, as illustrated in the accompanying drawing.

DETAILED DESCRIPTION

Figure 1:
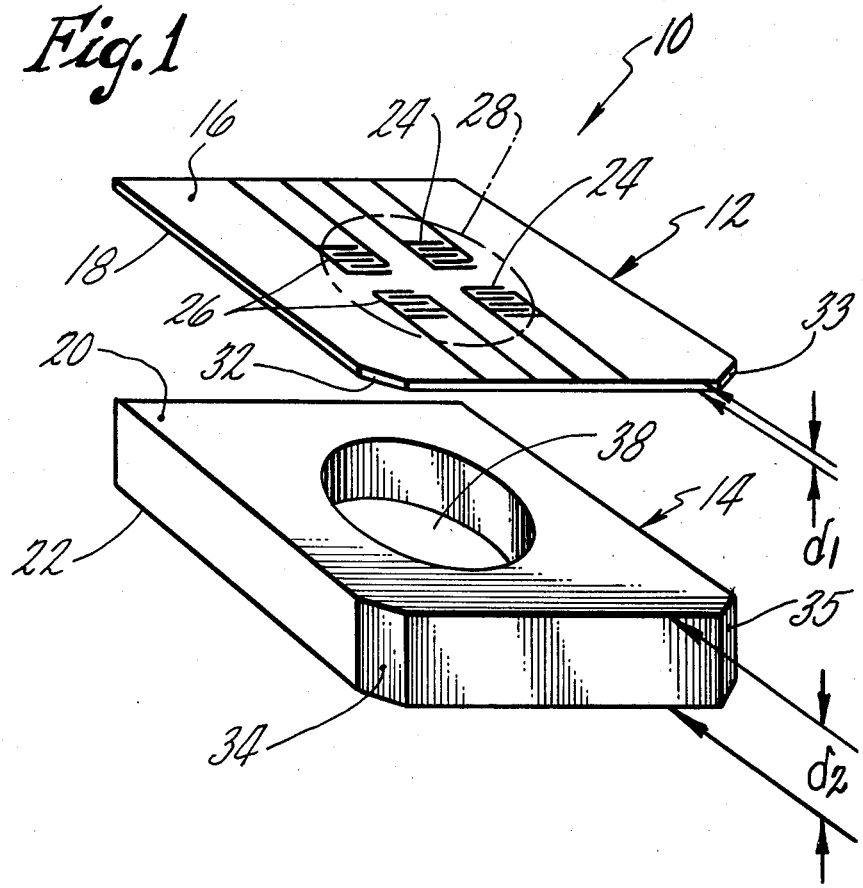
FIG. 1 is a perspective, exploded view of a SAW pressure sensor according to the present invention.

As shown in the FIG. 1 exploded view of the SAW pressure sensor of the present invention, the sensor has dual substrates, including a SAW substrate 12 and base substrate 14. The substrates are planar, the SAW substrate having major surfaces 16, 18 and the base substrate having major surfaces 20, 22. The SAW substrate includes one or more SAW delay lines formed by pairs of electro-acoustic transducers 24, 26 disposed in an active signal region 28 on the surface 16 through known photolithographic and vacuum metallizing techniques.

The transducers may comprise any one of a number of known interdigital configurations. The substrates 12, 14 are of the same material, typically piezoelectric material such as quartz, lithium niobate, or lithium tantalate. Of these, quartz is the most widely used because of its availability and lower cost. Alternatively the substrates may be nonpiezoelectric with a thin-film coating of piezoelectric material, such as zinc oxide, deposited on the surface between the transducers and the surface 16. In the embodiment of FIG. 1, it is assumed that the substrate material is piezoelectric such that the added piezoelectric material pads are not shown.

The substrates are cut from bulk crystal material. If the substrate material is quartz each is cut in any one of a number of known crystallographic orientations, such as a Y-cut or a ST-cut wafer. As may be known the quartz has anisotropic temperature coefficients of expansion, the Z (optic) axis having a temperature coefficient on the order of twice that in the X or Y axes. For the Y-cut quartz wafer, a common crystallographic orientation for SAW substrates, the temperature coefficients of expansion along the Z and X axes are on the order of $14 \times 10^{-6}$ in/in$-°$C. and $7 \times 10^{-6}$ in/in$-°$C. respectively. The quartz wafers are marked with indices to locate the X axis orientation, the axis of propagation of the acoustic wave through the quartz, and may take the form of notches 32–35 on the substrates 12, 14.

The two substrates for the sensor 10 are formed separately and bonded together by the process described in detail hereinafter. The saw-cut wafer for the SAW substrate is coarse lapped and chemo-mechanically polished on each of the two surfaces 16, 18 to provide a resultant SAW substrate at a dimension ($d_1$) between the surfaces which is equal to the desired membrane thickness of the resultant diaphragm formed in the active signal region 30, as described hereinafter. The individual processing of the SAW substrate provides for a closely regulated membrane thickness in dependence on the desired sensitivity and operating pressure range of the sensor. Control of the membrane thickness is far superior to that permitted in the prior art pressure sensors where the membrane thickness is established by the depth of the bored cavity.

The base substrate 14 is similarly lapped to eliminate small saw-cut imperfections on the surfaces 20, 22, but these surfaces need not be further polished. Preferably the surface 20, which mates with the surface 18 of the SAW substrate, is provided with a rough finish to permit greater adhesion of the glass seal provided between the two substrates. The base substrate thickness, i.e. the dimension ($d_2$) between the surfaces 20, 22, is not critical but is selected at a value sufficient to displace the SAW active signal region from the base substrate bottom surface, thereby eliminating induced strain in the region resulting from temperature cycling of the surface on which the base substrate 14 is mounted, i.e. the source of the pressure signals to be measured. Typically, the dimension $d_2$ is one the order of 0.120 inches, which is considered sufficient to provide the necessary isolation.

The base substrate includes a centrally located aperture 38 which provides a fluid communication path, or conduit though the base substrate. The aperture is formed by boring, or drilling, through the quartz wafer with methods known in the art. Ultrasonic drilling is preferred. Although diamond drilling is faster than ultrasonic drilling, the diamond drilling process has the disadvantage of causing potential microcracks in the substrate in addition to a higher tendency of a diamond drill bit to bind in the wafer material, whereas ultrasonic drilling, although slower, minimizes the risk of microcracks. During the ultrasonic drilling the base substrate is immersed in a coolant to prevent excessive heat buildup in the substrate and a slurry mixture of grit, such as aluminum oxide, is pumped into the ultrasonic drill head to provide the abrasive. The side of the substrate on which the drill bit exits is held down to a drilling base by waxing the surface to prevent motion of the substrate and prevent damage to the exist surface due to drill bit "breakout".

The aperature diameter at the mating surface with the SAW substrate has a diameter equal to that of the active signal region 30 of the SAW substrate. Bonding the two substrates together with alignment of the aperture and the circumference of the active signal region produces the deformable diaphragm of the sensor with a membrane thickness equal to the SAW substrate dimension $d_1$. The substrates are bonded with a glass seal formed from a glass frit. The frit may be either vitreous or a devitrifying type in dependence on providing the glass seal with a temperature coefficient of expansion which is compatible with the substrate material, i.e. whether piezoelectric or nonpiezoelectric. With piezoelectric substrate material such as quartz, the frit temperature coefficient is preferably at an intermediate value to the anisotropic temperature coefficients of the quartz substrate in each of the two orthogonal axes. In the formation of the seal the glass frit is applied to the upper surface of the base substrate by known methods, such as screen printing which allows for accurate control of the frit coating thickness. Following application of the frit the base substrate is fired in air at a temperature in the range of from 200° to 250° C. for a time period selected to allow a burn-off of the glass frit additives, such as the leveling agents which control the flow characteristics of the frit and the binders which hold the frit in suspension. The firing time is determined by the type of frit, typically on the order of thirty minutes. After this step the glass frit is in a "green state", i.e. it has not yet been flowed, and the two substrates are placed in a weighted holding fixture designed to receive the dual assembly and hold it in compression. When placed in the holding fixture the substrates are aligned to provide: crystallographic orientation of the two substrates as indicated by the notches 32–35 on the substrates and to ensure placement of the active signal region 30 coextensive with the aperture opening at the surface 20 of the base substrate. Following alignment of the substrates the holding fixture is placed in a temperature chamber and the temperature is increased to the frit melting point. In the case of piezoelectric substrate material the temperature must be limited below a maximum value above which phase transition of the piezoelectric material may result, causing degradation of the piezoelectric properites. For quartz substrates the maximum temperature value is 550° C. such that the frit selected, whether vitreous or devitrifying, must have a melting point temperature below this value. A vitreous glass frit suitable for use with quartz has a melting point temperature on the order of 425° C., and the oven temperature is maintained at the melting point temperature for approximately fifteen minutes to allow the frit to flow and seal the two substrates together. After the fifteen minute firing time the bonded structure is allowed to cool to room temperature at a rate of 10° C. per minute.

Figure 2:
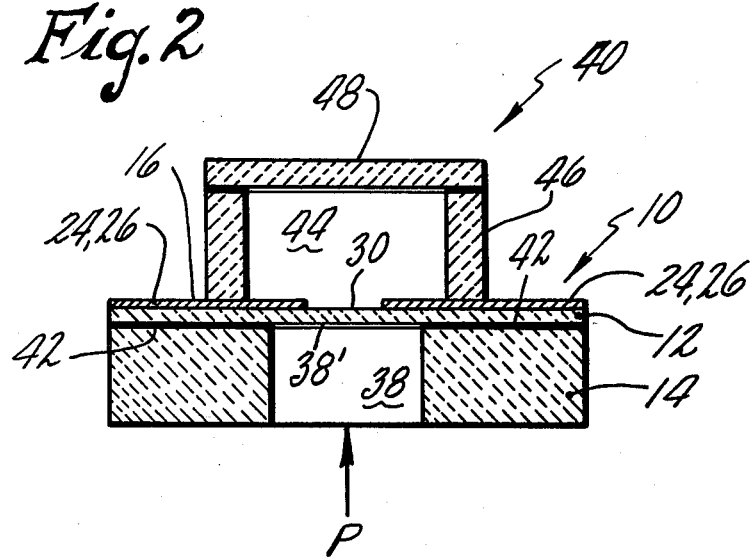
FIG. 2 is a simplified, cutaway, side elevation view of one embodiment of an improved SAW pressure sensor structure according to the present invention.

The completed asembly of bonded dual substrates with the SAW delay line disposed on the surface 16 of the SAW substrate represents a completed SAW pressure sensor assembly. Although the sensor may be used without further structure, and without vacuum encapsulation of the SAW substrate, the applications are limited to low accuracy devices for measuring relative pressure. In high accuracy absolute pressure applications the active region of the SAW delay line must be vacuum encapsulated to protect against surface contamination and also to provide an absolute zero psi reference on one side of the diaphragm. One method of providing a vacuum encapsulated SAW pressure sensor structure is disclosed in the hereinbefore referenced, copending application entitled VACUUM ENCAPSULATION FOR SURFACE ACUOSTIC WAVE (SAW) DEVICES to D. E. Cullen and myself, where a SAW pressure sensor structure 40, illustrated in FIG. 2, includes the SAW sensor 10 as the encapsulated SAW device. The SAW sensor has dual substrates 12, 14 bonded together with the glass seal 42, and has a diaphragm with one surface formed by the active signal region 30 and a second surface comprising a portion 18′ of the bottom surface 18 of the SAW substrate. The aperture 38 provides a fluid conduit for external pressure signals to the interior surface 18′ of the diaphragm. The active signal region and transducer pairs 24, 26 disposed therein are vacuum encapsulated in a vacuum environment 44 by an enclosure comprised of spacer and cap assemblies 46, 48 each formed from the same material as the substrates 12, 14. The cap and spacer are joined together and joined to the surface 16 of the SAW sensor in a vacuum sealing relationship and in crystallographic orientation as disclosed in the copending application. The spacer 46 is of nonconductive material and may be placed directly over the conductors attached to the transducer pairs 24, 26 without electrical interference with the conductors.

Figure 3:
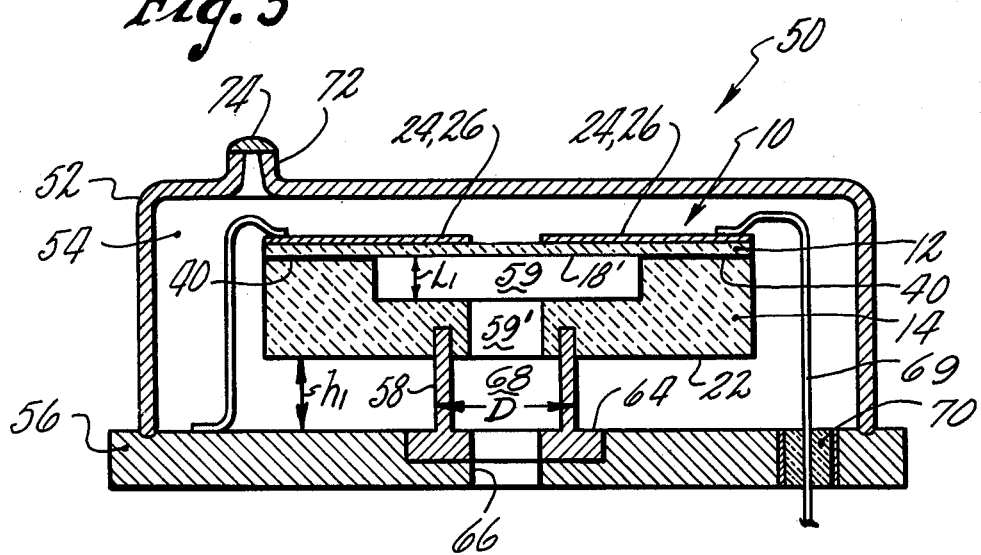
FIG. 3 is a simplified, cutaway, side elevation view of another embodiment of an improved SAW pressure sensor structure according to the present invention.

In a metal encapsulated SAW pressure sensor electrical interconnection to the transducers requires a more extensive structure as illustrated in FIG. 3. The metal vacuum structure 50 includes a cover portion 52 adapted to enclose the sensor within a vacuum chamber 54 formed by joining the cover 52 in a vacuum-sealing relationship with a base portion 56. The sensor 10 is supported within the vacuum chamber by a cylindrical metal sleeve 58 identical to that disclosed and claimed by D. E. Cullen in the hereinbefore referenced copending application entitled SURFACE ACOUSTIC WAVE (SAW) TRANSDUCER STRUCTURE. The sleeve supports the sensor at a displacement (height $h_1$) from the base 56. The structure of FIG. 3 provides an improvement over that claimed by Cullen in that the dual substrate sensor permits forming a segmented aperture within the base substrate 14 thereby permitting the sleeve 58 to be formed with the minimum desirable diameter recited by Cullen, on the order of one half that of the diaphragm. As illustrated the segmented aperture includes a first portion 59 having an aperture diameter at the interior surface 18′ which is equal to the desired diameter of the diaphragm. The aperture 59 has a length ($L_1$) within the substrate 14 which is selected to provide a sufficient volume adjacent to the surface 18′ to allow for the distribution of pressure forces across the entire diaphragm surface. A second portion 59′ of the segmented aperture has an opening at the surface 22 of the base substrate which is less than half the diameter of the aperture 59. As a result, the diameter (D) of the metal sleeve may be provided at a value which is equal to one half the diaphragm value, which is the optimum diameter of the sleeve to minimize the difference in expansion between the metal sleeve and the substrate material over temperature.

Figure 4:
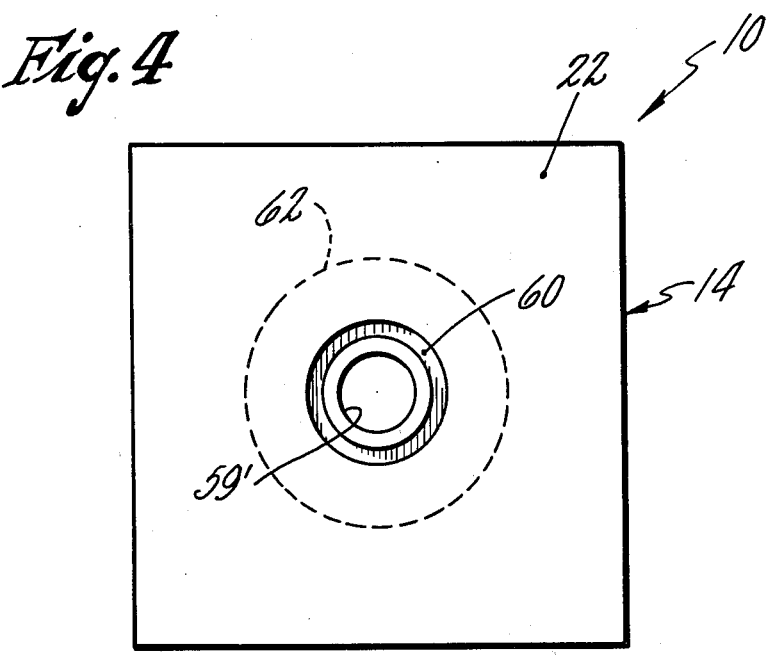
FIG. 4 is a bottom view of the SAW sensor included in the pressure sensor structure of FIG. 3.

The segmented aperture portions 59, 59' are formed in the base substrate prior to the bonding of the base to the SAW substrate. Each portion is formed using the same techniques described hereinbefore for the aperture 38. The smaller aperture 59' diameter is formed first and the larger aperture 38, concentric with that of the smaller aperture, is then formed by providing a counterbore at the length $L_1$. The bottom surface 22 of the base substrate 14 is adapted to receive the metal sleeve by forming an O-ring groove in the surface, as shown in FIG. 4 which illustrates the bottom surface of the base substrate 14 (bottom of the sensor 10). The smaller diameter aperture 59' is centrally located in the surface. The O-ring groove 60 has a groove width selected to receive the cylinder wall of the sleeve 58, the width of the groove being slightly larger than the cylinder wall thickness to permit insertion of a glass frit into the groove. The groove diameter is approximately one half that of the diaphragm, illustrated by the dashed circle 62, or one half the diameter of the aperture 59. The groove is located on a surface at a selected radial distance from the opening of the aperture 59' to prevent microcrack damage to the substrate 14 during the formation of the groove, or as a result of the dissimilar temperature expansion of the metal and the substrate material.

The metal seal between the metal sleeve and the substrate is provided in the same manner as the seal 42 formed between the substrates 12, 14. Typically the metal seal and the substrate seals are formed at the same time. The selected glass frit is applied both to the surface 20 of the base substrate and along the inside of the O-ring groove 60. After firing the substrate base in air to remove the glass frit additives the combination of the two substrates together with the metal sleeve are assembled together and placed in a weighted holding fixture designed to receive the added assembly of the sleeve. The assembly again holds the three components in compression within a temperature chamber during the melting of the glass frit. The glass seal formed in the O-ring between the sleeve and substrate provides a superior vacuum seal over an extended temperature range than that provided by a solder seal.

In the structure of FIG. 3, the sleeve 58 may also include a shoulder 64, as disclosed by the Cullen application, which provides a convenient mounting surface to the base 56 of the vacuum enclosure. Similarly the base 56 includes an opening, or orifice, 66 which permits fluid communication between an external source of pressure signals and the interior surface 18' of the diaphragm via the fluid conduit 68 provided by the sleeve. The electrical connections to the transducer pairs 24, 26 are provided through electrical conductors 69 in the same manner described by Cullen, i.e. by passing the conductors through the wall of the base 56 with feed-through insulators 70. A ground wire 71 may also be provided to the base 56 which provides a signal return path, if preferred, to reduce the number of required feed-through insulators. A pinch off tube 72 in the cover 52 permits evacuation of the chamber 54 following the completed assembly of the structure, after which the tube is vacuum sealed with a solder seal 74.

The improved pressure sensor and the vacuum encapsulating structures therefor, according to the present invention, provide for a significant number of advantages over the prior art sensors and structures. The dual substrate sensor permits formation of the deformable diaphragm without all of the attendant problems described hereinbefore, permitting a diaphragm having a closely controlled membrane thickness and uniformity, i.e. parallelism between the two diaphragm surfaces. The encapsulation of the improved sensor with the vacuum enclosure formed from the same substrate material provides for a more reliable structure than that previously known, due to the higher accuracy in forming the pressure sensor. In addition the improvement in vacuum encapsulation of the sensor within a metal can enclosure is provided by a metal sleeve isolator at the optimum diameter of one half that of the diaphragm, to minimize the difference in thermal expansion thereby minimizing the thermal strain induced in the diaphragm as a result of thermal cycling of the metal enclosure itself. Similarly, although the invention has been shown and described with respect to illustrative embodiments thereof, it should be understood by those skilled in the art that the foregoing and various other changes, omissions and additions in the form and detail thereof may be made therein without departing from the spirit and the scope of the invention.

Having thus described typical embodiments of my invention, that which I claim as new and desire to secure by Letters Patent is:

1. An improved SAW pressure sensor structure of the type which includes a SAW pressure sensor having a deformable diaphragm formed in a substrate thereof, a vacuum sealing enclosure adapted to receive the SAW sensor in a vacuum environment, and a cylindrical metal sleeve for supporting the SAW sensor within the vacuum enclosure, the sleeve having a central aperture for providing fluid communication between the SAW sensor diaphragm and an orifice provided in the wall of the vacuum enclosure, wherein the improvement comprises:

a SAW pressure sensor having dual piezoelectric substrates including a SAW substrate having electro-acoustic transducers disposed in an active signal region on a first one of two parallel major surfaces thereof and including a base substrate bonded in crystallographic orientation to said SAW substrate with a glass seal formed between a second one of said parallel major surfaces and a mating surface of said base substrate, said base substrate having an aperture extending therethrough between said mating surface and a base surface thereof, said aperture having a major diameter opening at said mating surface which is coextensive with said active signal region and having a minor diameter opening at said base surface which is less than one half that of said major diameter, said base surface further including a circular groove circumscribing said aperture minor diameter opening and adapted for bonding to one end of the metal sleeve with a glass seal formed between mutually matching surfaces of each.

* * * * *